US009789517B2

United States Patent
Doublet et al.

(10) Patent No.: US 9,789,517 B2
(45) Date of Patent: Oct. 17, 2017

(54) SELECTIVE SORTING METHOD

(71) Applicants: Veolia Environnement—VE, Paris (FR); Sileane, Saint-Etienne (FR)

(72) Inventors: Jérémy Doublet, Ayguesvives (FR); Christophe Gambier, Blagnac (FR); Hervé Henry, Saint-Cyr-les-Vignes (FR); Julien Reynard, Montmorin (FR)

(73) Assignees: VEOLIA ENVIRONNEMENT—VE, Paris (FR); SILEANE, Saint-Etienne (FR)

( * ) Notice: Subject to any disclaimer, the term of this patent is extended or adjusted under 35 U.S.C. 154(b) by 0 days.

(21) Appl. No.: 15/040,184

(22) Filed: Feb. 10, 2016

(65) Prior Publication Data

US 2016/0228920 A1    Aug. 11, 2016

(30) Foreign Application Priority Data

Feb. 10, 2015  (FR) ..................... 15 51082

(51) Int. Cl.
*B07C 5/34* (2006.01)
*B07C 5/02* (2006.01)
(Continued)

(52) U.S. Cl.
CPC .............. *B07C 5/34* (2013.01); *B07C 5/02* (2013.01); *B07C 7/005* (2013.01); *B65G 47/90* (2013.01); *B65G 2203/046* (2013.01)

(58) Field of Classification Search
CPC ......... B07C 5/342; B07C 5/346; B07C 5/361; B07C 5/362; B07C 2501/0063;
(Continued)

(56) References Cited

U.S. PATENT DOCUMENTS

| 5,501,571 | A | * | 3/1996 | Van Durrett | ........... | B65G 61/00 |
| | | | | | | 414/21 |
| 6,699,007 | B2 | * | 3/2004 | Huang | ................... | B65G 47/90 |
| | | | | | | 414/21 |

(Continued)

FOREIGN PATENT DOCUMENTS

| WO | WO 98/19799 | 5/1998 |
| WO | WO 2009/068792 | 6/2009 |

OTHER PUBLICATIONS

Search Report dated Dec. 3, 2015 out of corresponding French priority Application No. 1551082 (6 pages).

(Continued)

*Primary Examiner* — Joseph C Rodriguez
(74) *Attorney, Agent, or Firm* — Brinks Gilson & Lione; G. Peter Nichols

(57) ABSTRACT

A selective sorting method in order to identify and sort material objects of different natures, sizes and shapes having the form of a pile is described. The method is characterized in that the choice of a gripping zone, associated with an object contained in the pile to be sorted, is carried out automatically, and in that the defining of the nature of the object associated with this gripping zone is carried out using at least one sensor that measures at least one electromagnetic radiation emitted by this object. A device able to implement such a method is also described.

11 Claims, 1 Drawing Sheet

(51) Int. Cl.
   *B07C 7/00* (2006.01)
   *B65G 47/90* (2006.01)
(58) Field of Classification Search
   CPC ........ B65G 47/14; B65G 47/32; B65G 47/90;
              B65G 47/905; B65G 47/907; B65G
              47/91; B65G 47/917; B65G 47/918;
              B65G 47/92; B65G 2203/0225; B65G
              2203/0233; B65G 2203/041; B65G
              2203/042; B65G 2203/046
   See application file for complete search history.

(56) References Cited

U.S. PATENT DOCUMENTS

| | | | |
|---|---|---|---|
| 8,644,984 B2* | 2/2014 | Nagatsuka | B25J 9/1671 414/426 |
| 9,156,162 B2* | 10/2015 | Suzuki | B25J 9/16 |
| 9,333,649 B1* | 5/2016 | Bradski | B25J 9/163 |
| 2013/0006423 A1* | 1/2013 | Ito | B25J 9/1612 700/259 |
| 2013/0151007 A1* | 6/2013 | Valpola | B25J 9/1694 700/245 |
| 2013/0238124 A1* | 9/2013 | Suzuki | B25J 9/16 700/250 |
| 2014/0079524 A1* | 3/2014 | Shimono | B25J 9/1669 414/796.9 |
| 2016/0199884 A1* | 7/2016 | Lykkegaard | B07C 5/02 700/223 |
| 2016/0228921 A1* | 8/2016 | Doublet | B07C 5/3416 |
| 2016/0256897 A1* | 9/2016 | Kara | B07C 1/00 |

OTHER PUBLICATIONS

Search Report dated Dec. 3, 2015 out of French Application No. 1551084 (6 pages).

* cited by examiner

SELECTIVE SORTING METHOD

This application claims priority to French Patent Application No. 1551082 filed Feb. 10, 2015, the entire contents of which is incorporated herein by reference.

BACKGROUND

This invention generally relates to a selective sorting method in order to identify and sort material objects of different natures, sizes, weights and shapes. This invention also relates to a device able to implement such a method of sorting.

More precisely, the invention relates to a selective sorting method for a set of objects in the form of a pile.

SUMMARY

Sorting objects, when it is performed manually is a physically intense activity, resulting in the repetition at a high speed of relatively ample and repetitive gestures, calling substantially on the limbs, in particular the upper limbs.

The repetition of these gestures can be at the origin of musculoskeletal disorders that should be avoided as much as possible in order to reduce as much as possible any injury or discomfort caused by this manual sorting.

In addition the manual gripping of objects imposes the presence of operators in the same space as the objects to be sorted, which directly exposes the operators to risks of all natures (physical damage, cuts, punctures, dirt, dust, etc.) generated by the objects to be sorted.

The wearing of personal protective equipment (PPE), as well as the layout of workstations (adequate ventilation and infrastructure in particular) are of course of a nature to reduce these risks, but cannot entirely suppress them.

As such, in order to reduce the discomfort caused by manual sorting, and in order to facilitate the displacement of cumbersome objects and of substantial weight, hydraulic machines can be used in sorting zones. As an example of hydraulic machines, mention can be made of construction equipment such as cranes, or hydraulic shovels. However, these machines do not make it possible to achieve satisfactory levels of performance and productivity. Furthermore, it is difficult to accurately control the extraction of an object in particular and to be able to observe it entirely during its displacement.

That is why automated systems are developed in industry with the purpose, in particular, to reduce human exposure to dangerous or potentially dangerous situation, to replace the manual operations in tedious and repetitive tasks, but also in order to increase the sorting performance in terms of quality or/and productivity. For example, in the agro-food sector, robotic systems are used to effectively and rapidly sort fruits and vegetables according to various predefined criteria, in particular physical criteria, such as the shape, the size or the level of maturity of an organic product.

On an industrial scale, current automatic sorting does not make it possible to take into consideration all of the aforementioned criteria simultaneously.

Typically, in the field of processing waste, automatic sorting must be combined with human operations. More precisely, an operator has to intervene, often at the end of the chain, in order to sort each one of the pieces of waste since he alone can recognize all of the objects, while automated sorting machines can only identify a certain number of predefined objects.

To this effect, substantial progress has been made on automatic sorting devices, i.e. that automate certain tasks.

Automatic sorting devices and the sorting methods that implement them, are known to those skilled in the art. For example, international application WO 98/19799 discloses a method as well as a device for selectively sorting waste with a remote operator, comprising means for designating on a touch-sensitive screen an object to be extracted, and means for selective extraction controlled by designation on the touch-sensitive screen of the object. This designation allows for sorting at a distance, i.e. any manual grasping of any object does not require the presence of an operator in the same space as the objects.

Moreover, more recently, international application WO 2009/068792 describes a method as well as a selective sorting device that improves those described in WO 98/19799, by making it possible in particular at very high speed. More particularly, in the device of WO 2009/068792, it is possible to modify the visual appearance of an image of a targeted object on a video screen.

However, note that these devices known in prior art do not make it possible to sort a pile that can contain objects of different shapes and/or different sizes and/or different natures. Indeed, these devices allow only for the sorting of objects that are presented beforehand in unitary form.

More generally, it is known to those skilled in the art automated sorting devices that make it possible to sort objects of different natures, weights or shapes such as waste only if these objects are presented beforehand in unitary form. In this configuration, all of the objects are separated from one another, in such a way that it is possible to distinguish the contour of them, with the objects remaining in the form of a pile then being sorted manually.

DESCRIPTION

As such, there is a real need to propose a method and a device that makes it possible to sort a pile that can contain objects of different sizes and/or shapes and/or natures, in particular waste, by allowing for an increase in the productivity and in the effectiveness of any sorting method of prior art, while still reducing, and even suppressing the physical arduousness of the sorting thanks to the use of interfaces rather than contacts between the objects and the operators.

Note that pile, in the sense of this invention, means a set of entangled heterogeneous objects and arranged randomly on top of one another, said objects being waste.

In this context, the applicant has developed a method that overcomes the disadvantages of prior art and meets the objectives mentioned hereinabove.

More particularly, this invention has for object a selective sorting method in order to identify and sort material objects of different natures, sizes, and shapes and having the form of a pile, said method comprising the following steps:

(a) supplying a flow of objects in the form of a pile, to a zone of vision that comprises at least two sensors for measuring electromagnetic radiation, said zone being located in the zone of action of a robot provided with one or several gripping members;

(b) capturing at least two two-dimensional images of the pile contained in said zone of vision using said sensors for measuring electromagnetic radiation, in order to reconstruct a virtual or electronic image of the pile of objects in the zone of vision;

(c) processing the information resulting from said two-dimensional images, and identifying all of the possible gripping zones associated with objects present in the pile for said gripping member or members of said robot;

(d) locating, in position and orientation, said possible gripping zones, and (e) choosing one of the gripping zones;

(f) defining automatically, for a given gripping member, a trajectory for gripping an object corresponding to the gripping zones chosen;

(g) grasping the corresponding unitary object according to the defined trajectory;

(h) displacing said grasped unitary object to a receiving zone that has been attributed to it;

(i) displacing said unitary object located in said receiving zone towards an outlet according to the nature;

said method being characterized in that the step (e) of choosing a gripping zone is carried out automatically, and in that a step (h') is carried out, between the steps (h) and (i), of defining the nature of the object located in the receiving zone, using at least one sensor that measures at least one electromagnetic radiation emitted by said unitary object in said receiving zone.

Note that the pile of objects that can be sorted by the method according to the invention can for example contain, in a non-limiting manner, cumbersome objects or objects of small sizes, of waste whether industrial or domestic.

As such, waste, in the sense of the invention, means any object, or more generally any movable item, of which the holder discards or of which the holder has the intention or the obligation to discard, for the purposes of valorization or elimination, whether the holder be an industrialist, a collective unit or a private individual.

The objects of the pile that can be sorted by the method according to the invention are for example household waste whether or not organic, electronic waste, waste concerning construction, furniture waste, waste from industry, etc.

As a general rule, the objects that are to be sorted are brought to a processing center in order to be valorized, for example in order to be recycled. Note that the objects to be sorted are typically arranged in bulk form or in piles, which can include a more or less large number of randomly entangled objects, in a receiving zone of the processing center. Then, they are generally transferred to means of processing and other specific devices. Their transfer, from a receiving zone of the processing center to the means for processing, is carried out by using known means of transfer, as for example, shovels or conveyors.

The method according to the invention is as such supplied by these means of transfer with objects to be sorted, said objects to be sorted being generally in the form of piles.

Then, the method according to the invention is implemented in order to identify and sort a succession of piles constituted of material objects of different natures, shapes and sizes.

The first step (a) of the method according to the invention consists in supplying a zone of vision located in the zone of action of a robot provided with one or several gripping members, with objects that are generally in the form of a pile.

The supplying of this zone of vision with objects can be carried out either according to a supply in batches, or according to a continuous supply.

In the sense of this application, a supply in batch means a supply by lot. In other terms, the supplying of the zone of vision is discontinuous. A single pile of objects at a time is processed. In this configuration, as long as all of the objects have not been sorted, the zone of vision is not supplied. But when the last object contained beforehand in the pile is grasped by at least one gripping member of said robot, another pile is displaced into the zone of vision in order to be subsequently treated.

In the sense of this application, continuous supply means a supplying without deactivating the means that make it possible to provide the zone of vision with objects. In this configuration, objects to be sorted are displaced to the zone of vision continuously by adapting the speed of displacement of the objects to be sorted.

The zone of vision comprises at least two sensors for measuring electromagnetic radiation. It is also possible to add in this zone a source of incident electromagnetic radiation in order to allow for a level of emission of electromagnetic radiation that is sufficient by the pile of objects.

These sensors of make it possible to capture, step (b) of the method according to the invention, at least two two-dimensional images of the pile present in said zone of vision. These two-dimensional images make it possible to reconstruct one or several virtual or electronic images of the pile of objects in the zone of vision. These images are not necessarily viewed on a screen.

These two-dimensional images are analyzed and processed, step (c) of the method according to the invention, with the purpose of identifying all of the possible gripping zones for the gripping member or members of the robot and for identifying the gripping member that is most suited for each one of the possible gripping zones, said zones being associated with objects present in the pile.

Note that by gripping zone, or specific zone, in the sense of this invention, refers to a zone that can be gripped by any gripping member of a robot. Note also that several gripping zones can be associated with one object contained in the pile.

The processing of these two-dimensional images can, for example, be carried out using calculating software and image processing software.

After all of the gripping zones have been identified thanks to the processing and to the analyses of the two-dimensional images, the gripping zones are located in position and in orientation, step (d) of the method according to the invention.

Then, the choosing of one of the gripping zones, step (e) of the method according to the invention, is carried out automatically thanks to the use of an algorithm. Said choice, or selection, of a specific zone can then be carried out without the intervention of an operator.

Advantageously, the algorithm can calculate the probability of success of gripping each gripping zone by one of the gripping members of the robot, and thanks to the combined uses of calculating software and of image processing software, each gripping zone identified is weighted with a coefficient (referred to as weighting) which is according to the probabilities of success of the gripping by a gripping member of a robot. Once each gripping zone has been associated with a particular coefficient, the gripping zone having the highest probability of success in gripping is gripped with priority by a gripping member of the robot.

Note that that the weighting coefficient can furthermore be according to a certain number of parameters. It can, for example, be according to the distance that separates the possible localized gripping zone from the corresponding gripping member. The weighting coefficient can also be calculated according to the orientation of the zone to be gripped. The probabilities of success depend on the gripping member used.

Other parameters can be taken into consideration such as the vertical position or altitude of each one of the localized gripping zones. The weighting coefficient can as such take this parameter into account, so that subsequently, the gripping member grips with priority the objects associated with the gripping zone identified as being the highest.

Preferentially, one of the members of the robot grips with priority the gripping zone associated with the probability of success for gripping that is the highest.

Note that during this gripping, the gripping trajectory of the robot can be calculated by using calculating software, step (f) of the method according to the invention. Furthermore, a particular gripping trajectory can be associated to each gripping zone. The method is then advantageous due to the fact that it is possible to grasp and deposit a unitary object quickly.

The robot can then grip the unitary object characterized by the gripping zone to be gripped with priority according to a defined trajectory step (g) according to the method of the invention).

After the robot has gripped the priority gripping zone, and defined by the algorithm using one of its gripping members, the unitary object associated with this gripping zone is transferred from the zone of vision to a receiving zone, step (h) of the method according to the invention.

Then, the step consisting in defining the nature of the unitary object, step (h') of the method according to the invention is carried out in the receiving zone, and more particularly between the aforementioned steps (h) and (i).

Note that according to the invention, the zone of vision of the pile of objects and the receiving zone of the unitary object are separate zones, i.e. separate volumes of the processing center.

According to an advantageous alternative of the method according to the invention, the step consisting in defining the nature of the object, step (h') of the method according to the invention, in the receiving zone is carried out by the recovery of measurements captured by one or several sensors that measure one or several electromagnetic radiations of the visible or non-visible spectrum, and by comparing these measurements with a set of data recorded in a memory, by using a computer program.

According to another advantageous alternative of the method according to the invention, the step consisting in defining the nature of the object, step (h') of the method according to the invention, in the receiving zone is carried out by the recovery of images of the unitary object by one or several cameras and by comparing images of the unitary object obtained with a set of data recorded in a memory, by using a computer program.

According to a last advantageous alternative of the method according to the invention, the step consisting in defining the nature of the object, step (h') of the method according to the invention is carried out by the recovery of by a radio frequency interrogator of a radio frequency signal transmitted by a transponder affixed or built into the unitary object, with said signal being compared to a set of data recorded in a memory, by using a computer program.

Note that the interrogator can be an active radio frequency system that activates and reads the identification data integrated into the object of which the nature has to be identified. This identification is carried out using a transponder, and by comparing this data with a set of data recorded in a memory.

According to this alternative, the interrogator/transponder pair can for example be an RFID reader/RFID tag pair. This alternative supposes that the objects of the pile are provided with a transponder.

Thanks to the comparing of measurements or images recovered by one or several sensors of electromagnetic radiation, or cameras, with the data recorded in a memory, it is possible to qualify the nature of the unitary object located in the receiving zone automatically, i.e. without the intervention of an operator.

Once a nature has been attributed to the object located in the receiving zone, it is displaced to a predefined outlet according to the nature that was attributed to it (step i) according to the method of the invention.

According to the method of the invention, all of the objects constituting the pile are sorted. In other terms, all of the objects arriving in the zone of vision are gripped by the robot then displaced in the receiving zone.

This invention further has for object a selective sorting device, able to implement the previously described method, and comprising:

means for supplying a flow of objects having the form of a pile;

sensors for measuring electromagnetic radiation located in the zone of vision;

image processing and calculating software for processing the information resulting from said captured images in the zone of vision and for identifying and for locating gripping zones of the objects of the pile;

a mechanical robot provided with at least one gripping member in order to grip an object defined by one or several gripping zones in the pile and displace it from a zone of vision to a receiving zone;

means making it possible to identify the nature of the unitary object located in the receiving zone;

processing and calculating software in order to process the information resulting from said means that make it possible to identify the nature of the unitary object in the receiving zone;

means for removing the object placed in the receiving zone.

The device according to the invention is advantageous because it allows for a selective sorting remotely by avoiding any contact between an operator and any object to be sorted. Furthermore, the device according to the invention makes it possible to sort piles of objects that contain multiples material objects, in particular waste, that can be of different natures, sizes and shapes.

The device according to the invention comprises means that make it possible to supply a flow of objects having the form of a pile. For example, these means can be belt or roller conveyors, follower conveyors, ball tables, vibrating tables, mechanical devices comprising means for gripping, or any other device that makes it possible to displace a pile of objects from an initial point to another point. Collection bins wherein are placed the objects to be sorted can also be used. In this configuration, the bin is static during the sorting method as well as during the gripping of each one of the objects that it contains. However, as soon as said bin is empty, a bin containing new objects to be sorted is conveyed to the zone of vision and as such replaces the empty bin. It is also possible that the empty bin be filled directly by a collection vehicle which avoids replacing the bin.

The flow of objects supplies a zone of the device according to the invention, called zone of vision, with a pile of objects. In the case of use of a bin as a means making it possible to supply the flow of objects, the zone of vision is confounded with the volume of the bin.

The device according to the invention further comprises a mechanical robot provided with at least one gripping member that makes it possible, in a first step, to grip an object contained in the pile present beforehand in the zone of vision, with each object of the pile being defined by one or several gripping zones, and in a second step to displace the gripped object from the zone of vision to another zone, called a receiving zone.

Advantageously, the sensors for measuring electromagnetic radiation of the zone of vision of the selective sorting device according to the invention are cameras or laser scanning distance sensors.

The measurements of electromagnetic radiation allow the robot to grip a particular object by a preselected gripping zone. These measurements of electromagnetic radiation can also be analyzed and processed by calculating software and image processing software in order to allow for the identification and the locating of all of the possible gripping zones.

That is why, the camera or cameras or scanning distance sensors can advantageously be connected to means of image analysis.

Note that an object contained in the pile can be associated with several gripping zones or specific zones, with the measurements of electromagnetic radiation and calculating software making it possible according to the invention to define the gripping zones, not to identify the objects.

The device can further comprise means for processing and for calculating that can automatically associate to a gripping surface selected by an automaton, the member of the robot that is most suited.

Advantageously, the device can further comprise means for processing and for calculating that can automatically define a trajectory for gripping an object by the compatible specific zone, preselected by an automaton, for a particular gripping member of a mechanical robot.

In this way, the path followed by any gripping member of the robot is optimized. It is the fastest possible and also the shortest possible.

In the receiving zone, the means that make it possible to identify the nature of the unitary object gripped are advantageously chosen from among sensors of the spectrometric or spectroscopic type that makes it possible to reconstruct a spectral or multispectral or hyperspectral image, optical sensors, radio electric or radio frequency antennas, cameras or sensors for measuring electromagnetic radiation. The aforementioned sensors can also be used in combination.

Note that radio electric antennas can be implemented in order to memorize and recover data remotely by using markers or transponders, said markers being arranged beforehand on each one of the objects contained in the pile to be sorted. Sensors able to capture radio waves of the hertzian type or LIBS multiband sensors can also be used.

In the sense of this application, sensors for measuring electromagnetic radiation means in a non-limiting manner infrared or near infrared radiation sensors, ultraviolet radiation sensors, X-ray sensors, gamma radiation sensors, microwave radiation sensors, radiofrequency radiation sensors or two-dimensional image sensors such as cameras in the visible spectrum. The aforementioned sensors can also be used in combination.

Preferably, the images, or measurements, recovered by one or several of the aforementioned sensors are compared to a set of data recorded in a memory, by using a computer program.

Also note that the various previously mentioned radiation sensors are chosen according to the source or sources of electromagnetic radiation used.

The aforementioned means that make it possible to attribute a nature to the object gripped beforehand by the robot are advantageously placed in the receiving zone in such a way that as soon as a gripping member of a robot deposits a particular object therein, a nature is attributed to it thanks to the use of one or several of the aforementioned sensors and which can make it possible to characterize the material of the unitary object, or to attribute one to it when it is present in the receiving zone.

According to an alternative of the device according to the invention, the aforementioned means that make it possible to attribute a nature to the unitary object gripped by the robot are optionally placed on the arm of the robot or on a gripping member of the latter in such a way that a nature is attributed to the object during the displacement of the latter by the robot, without the object being deposited beforehand. This is made possible by the fact that the receiving zone is a volume of the processing center separate from the volume of the zone of vision and limited by the volume that the mechanical robot can pass through and the associated gripping device. As such, when the gripping device has left the volume of the zone of vision, the identification of the nature of the object gripped can start, without waiting to deposit the unitary object.

Preferably, the measurements recovered by the sensor or sensors that make it possible to characterize the material of the unitary object, or to attribute one to it, when it is located in the receiving zone are compared, using a computer program, to a set of data recorded in a memory.

In this way, the nature of the unitary object can be qualified automatically, i.e. without the intervention of an operator.

After a nature has been attributed to an object placed in the receiving zone, the gripped object is removed from said receiving zone to an outlet, by means of conveying according to the nature that was attributed to it.

Advantageously, the means for removing the unitary object from the receiving zone are chosen from among a belt conveyor, a mechanical robot, a vibrating table, or the same mechanical robot used for displacing a unitary object from the zone of vision towards the receiving zone.

For example, these means can be belt or roller conveyors, follower conveyors, ball tables, vibrating tables, mechanical devices comprising means for gripping, or any other device that makes it possible to displace a pile of objects from an initial point to another point.

These means of conveying can also be the mechanical robot itself, with the latter then being both a device for gripping the unitary object within the pile of objects and device for conveying to an outlet according to the nature. This alternative of the device according to the invention is particularly interesting when the means of identification of the nature of the object gripped by the mechanical robot are arranged on the arm of the latter or on the gripping device of the latter.

The object transiting on these means of conveying is displaced in a predefined outlet according to the nature that was attributed to it.

For example, the outlets can include manipulating arms or robots adapted to the characteristics of the objects to be extracted. These outlets can also include devices for the pneumatic ejecting thrown on the conveying belt, compressed air nozzles, routing systems, pushers using cylinders, traps, robots. Means of extraction that combine various aforementioned ejection devices can be applied.

Furthermore, the device according to the invention can include means for raising and following the movements and the positions of a particular object, between the gripping device of a robot and an outlet, according to time. These means can include sensors of electromagnetic radiation such as mentioned hereinabove.

BRIEF DESCRIPTION OF THE DRAWING

Other characteristics and advantages of this invention shall appear more clearly when reading the following description given by way of a non-limiting example and made in reference to annexed figure.

DESCRIPTION

Figure 1:
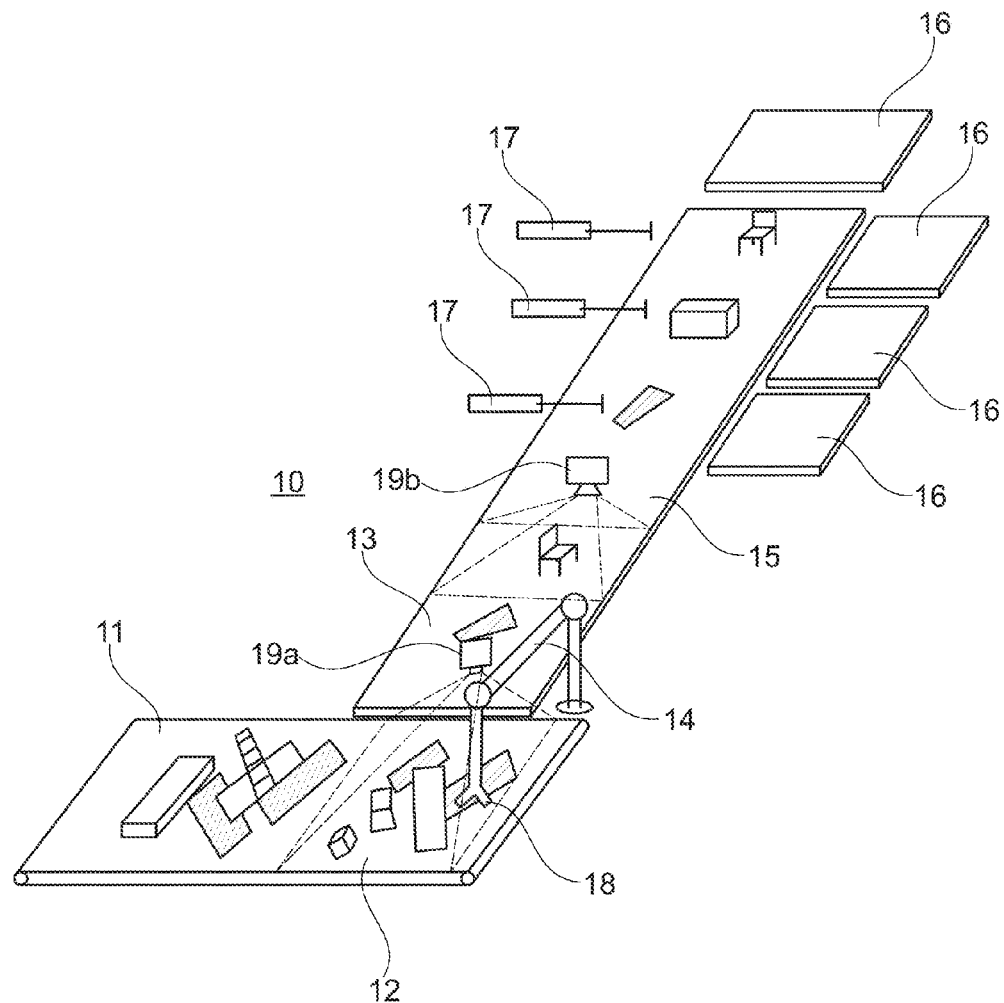
FIG. 1 a device according to the invention, seen in three dimensions, able to sort all of the objects contained in the initial pile.

In the example shown hereinafter, for the purposes of information and in a non-limiting manner, in a device according to the invention shown in FIGS. 1 and 2, a robotic solution marketed by the company SILEANE or by the company AKEO is used. These devices include a robot that comprises a poly-articulated system provided with one or several gripping members able to grip an object by a specific zone. In order to facilitate the reading of the figures, a single gripping member is shown in FIG. 1.

However, preferably, the robot can include at least two gripping members, with the first using a technology referred to as "suction" and the other a technology referred to as "clamp".

The robot shown in FIG. 1 comprises a single gripping member using the "clamp" technology.

FIG. 1 describes a device 10 according to the invention, making it possible to sort all of the objects contained in a pile, according to their nature.

The pile of objects comprises a bulk volume of heterogeneous objects placed randomly in such a way that the objects are entangled.

As shown in FIG. 1, the pile of objects, for the purposes of its processing, is arranged on a first belt conveyor 11.

This first belt conveyor 11 is able to supply a zone, called the zone of vision 12, with a pile of material objects.

The device of FIG. 1 comprises a camera 19a in the visible spectrum in order to carry out one or several two-dimensional images of the pile of objects located in the zone of vision 12.

In these conditions, the camera 19a is configured to acquire successive two-dimensional images of the pile located in the zone of vision 12. Note that the images captured cover the entire pile of objects.

One or several of said images of the pile of objects captured are then possibly processed and analyzed in order to allow for the identification and the locating of each possible gripping zone by a gripping member 18 of the poly-articulated robot 14.

To do this, the camera 19a is, for example, coupled to means for processing, which can be calculators and other software, configured to process the images coming from said sensors.

The combined uses of calculating software and of image processing software make it possible to weight each gripping zone identified beforehand with a coefficient which is according to the probabilities of success of the gripping by a corresponding gripping member, and to choose the gripping zone that has the highest probability of success for gripping.

The weighting coefficient can be according to any type of parameter. It can, for example, be according to the distance that separates the possible localized gripping zone from the corresponding gripping member 18. The weighting coefficient can also be calculated according to the orientation of the zone to be gripped. The probabilities of success are according to the gripping member 18 used.

According to the device 10 of FIG. 1, a gripping member 18 grips with priority the gripping zone associated with the probability of success for gripping that is the highest.

The device of FIG. 1 can furthermore use calculating and image processing software to also make it possible to define the fastest and shortest possible gripping trajectory, for a given gripping member 18.

Note that in order to allow for the obtaining of images that represent reality, the speed of the flow of objects being directed to the zone of vision 12, through the use of a belt conveyor 11 according to FIG. 1, is possibly not constant. For example, when a pile of objects reaches the zone of vision 12, the speed of the flow of the objects decreases, and is even cancelled, so that the sensors present in the zone of vision 12 can capture at least two two-dimensional images that represent the pile of objects.

One of the gripping members 18 of a robot 14 can therefore can take care of gripping a particular object associated with the specific zone considered as having priority as explained hereinabove.

After each gripping, the sensors capture new images of the pile of objects. In this way, the object to be gripped, which may have been displaced by the gripping of a preceding object, will even so be located and gripped.

The numbered steps hereinabove are reproduced until the pile contains no more objects.

When there are no more objects in the zone of vision 12, or on the order of an operator, the first belt conveyor 11 resumes operation in order to convey into this zone of vision 12 a new pile of objects to be sorted.

However, the band conveyor 11 could very well have functioned continuously, at a reasonable speed in order to allow the robot 14 to grip a particular object.

Then, in the device 10 of the invention shown in FIG. 1, it is not necessary for the image or images captured by the camera to be transferred on a video screen since the images captured beforehand are useful only for automatically identifying and locating each possible gripping zone by a gripping member 18.

Note that here, no operator intervenes. The choosing of any one of the gripping zones is carried out automatically according to the various coefficients that have been associated with each one of the specific grippings.

Furthermore, a removable abutment is optionally arranged at the end of the belt conveyor 11 in order to prevent a portion of the pile of objects to be sorted from being projected outside of the sorting device when this first belt conveyor 11 is operating.

Then, all of the objects gripped by any gripping member 18, as shown hereinabove, is arranged, according to FIG. 1, in a receiving zone 13 located on a second belt conveyor 15.

In this receiving zone is carried out the operation of attributing a nature to a unitary object gripped beforehand by said robot 14. This attribution does not require the intervention of an operator and can therefore be entirely automatic. For example, the operation of attributing a nature to a particular object can be carried out thanks to the use of sensors of the spectrometric or spectroscopic type, referenced as 19b in FIG. 1, in order to allow for the reconstruction of a spectral, multispectral or hyperspectral image and as such characterize the surface or the material of a given object and to associate with it a nature according to the results obtained. These sensors are coupled to computer programs in order to allow for the comparison of the electromagnetic rays received with a set of data recorded in a memory. Note that the computer program can contain an infinite number of pre-recorded natures and as such allow for the identification of any nature.

According to FIG. 1, after the attributing of a particular nature to an object, the object is directed towards a pre-defined outlet 16, in a first step, thanks to the use of a second belt conveyor 15 and in a second time thanks to the use of one or several means of extraction 17.

As shown in FIG. 1, the means of extraction 17 make it possible to extract the objects located on the second belt conveyor 15 and to convey them to the appropriate outlets 16 intended to receive them. FIG. 1 shows that these outlets 16 include pneumatic ejection devices that use cylinders.

Furthermore, means can be used to raise and follow the movements and the positions of a particular object, between the gripping device 18 of a robot 14 and an outlet 16, according to time.

The invention claimed is:

1. A selective sorting method in order to identify and sort material objects of the waste type, of different natures, shapes and sizes and having the form of a pile, the method comprising the following steps:
   a. supplying a flow of objects in the form of a pile, to a zone of vision comprising at least two sensors for measuring electromagnetic radiation, the zone of vision being located in a zone of action of a robot provided with one or several gripping members, a transponder associated with a type of nature being affixed or built into each object;
   b. capturing at least two two-dimensional images of the pile contained in the zone of vision using the sensors for measuring electromagnetic radiation, in order to reconstruct a virtual or electronic image of the pile of objects in the zone of vision;
   c. processing the information resulting from the two-dimensional images, and identifying all possible gripping zones associated with objects present in the pile for the gripping member or members of the robot;
   d. locating, in position and orientation, the possible gripping zones, and
   e. choosing one of the gripping zones;
   f. defining automatically, for a given gripping member, a trajectory for gripping a unitary object corresponding to the chosen gripping zone;
   g. grasping the corresponding unitary object according to the defined trajectory;
   h. displacing the corresponding unitary object that is grasped to a receiving zone;
   h' defining a nature of the unitary object located in the receiving zone using at least one sensor that measures at least one electromagnetic radiation emitted by the transponder in the receiving zone,
   i. displacing the unitary object located in the receiving zone to an outlet according to the nature that has been attributed to the unitary object,
   wherein the step (e) of choosing a gripping zone is carried out automatically,
   wherein the step h' of defining the nature of the object is carried out by using a radio frequency interrogator to recover a radio frequency signal transmitted by the transponder, with the signal being compared to a set of data recorded in a memory, by using a computer program.

2. The selective sorting method according to claim 1, wherein the step (h') is carried out by a recovery of measurements captured by at least one sensor that measures at least one electromagnetic radiation of the visible or non-visible spectrum, and by comparing these measurements with a set of data recorded in a memory, by using a computer program.

3. The selective sorting method according to claim 1, wherein the step (h') is carried out by recovery of images of the unitary object by at least one camera used as a sensor and by comparing images of the unitary object obtained with a set of data recorded in a memory, by using a computer program.

4. The selective sorting method according to claim 1, wherein the automatic choosing of one of the gripping zones of the step (e) is defined by the use of an algorithm.

5. The selective sorting method according to claim 4, wherein the algorithm calculates the probability of success of the gripping of each gripping zone by one of the gripping members of the robot.

6. The selective sorting method according to claim 5, wherein the grasping occurs, with priority, to the gripping zone associated with a highest probability of success for gripping.

7. The method according to claim 1 wherein a device able to implement the method comprises:
   means for supplying a flow of objects having the form of a pile;
   sensors for measuring electromagnetic radiation in the zone of vision;
   image processing and calculating software for processing the information resulting from the captured images in the zone of vision and for identifying and for locating gripping zones of the objects of the pile;
   a mechanical robot provided with at least one gripping member to grip an object defined by one or several gripping zones in the pile and displace the object from a zone of vision to a receiving zone;
   means for identifying the nature of the unitary object in the receiving zone;
   processing and calculating software in order to process the information resulting from the identifying means;
   means for removing the object placed in the receiving zone.

8. The method according to claim 7, comprising wherein the device comprises means for processing and for calculating in order to automatically define a gripping trajectory of the object by the robot.

9. The method according to claim 8, wherein the sensors for measuring electromagnetic radiation in the zone of vision are cameras or laser scanning distance sensors.

10. The method according to claim 7, wherein the identifying means is chosen from among sensors of the spectrometric or spectroscopic type that are able to reconstruct a spectral or multispectral or hyperspectral image, optical sensors, radio electric or radio frequency antennas, cameras or sensors for measuring electromagnetic radiation in the visible or non-visible spectrum.

11. The method according to claim 10, wherein the means for removing the unitary object from the receiving zone are chosen from among a belt conveyor, a mechanical robot, a vibrating table, or the same mechanical robot used for displacing a unitary object from the zone of vision towards the receiving zone.

* * * * *